US007247596B2

(12) United States Patent
Jialanella et al.

(10) Patent No.: US 7,247,596 B2
(45) Date of Patent: Jul. 24, 2007

(54) STABILIZED ORGANOBORANE POLYMERIZATION INITIATORS AND POLYMERIZABLE COMPOSITIONS

(75) Inventors: Gary L. Jialanella, Oxford, MI (US); Toni Ristoski, Rochester Hills, MI (US)

(73) Assignee: Dow Global Technologies Inc., Midland, MI (US)

( * ) Notice: Subject to any disclaimer, the term of this patent is extended or adjusted under 35 U.S.C. 154(b) by 362 days.

(21) Appl. No.: 10/864,719

(22) Filed: Jun. 9, 2004

(65) Prior Publication Data

US 2005/0004332 A1    Jan. 6, 2005

Related U.S. Application Data

(60) Provisional application No. 60/477,135, filed on Jun. 9, 2003.

(51) Int. Cl.
*B01J 31/18* (2006.01)
*C08F 4/12* (2006.01)

(52) U.S. Cl. ............... 502/123; 502/167; 502/125; 502/202; 526/317.1

(58) Field of Classification Search ............... 502/123, 502/167, 125, 202; 526/317.1
See application file for complete search history.

(56) References Cited

U.S. PATENT DOCUMENTS

| 3,236,823 | A | | 2/1966 | Leverkusen et al. ....... 260/80.5 |
|---|---|---|---|---|
| 3,275,611 | A | | 9/1966 | Mottus et al. ............. 260/80.5 |
| 3,527,737 | A | | 9/1970 | Masuhara et al. ......... 260/78.5 |
| 3,819,447 | A | | 6/1974 | Dalibor et al. ............. 156/330 |
| 3,971,751 | A | | 7/1976 | Isayama et al. ........... 260/37 R |
| 4,344,800 | A | | 8/1982 | Lutz ........................ 106/308 Q |
| 4,385,153 | A | | 5/1983 | Ritter ........................ 524/522 |
| 4,426,243 | A | | 1/1984 | Briggs ...................... 156/307.3 |
| 4,448,927 | A | | 5/1984 | Falener et al. ............. 524/860 |
| 4,515,724 | A | | 5/1985 | Ritter ........................ 260/410 |
| 4,538,920 | A | | 9/1985 | Drake ........................ 366/177 |
| 4,552,604 | A | | 11/1985 | Green ........................ 156/246 |
| 4,676,858 | A | | 6/1987 | Ritter ........................ 156/307 |
| 4,705,838 | A | | 11/1987 | Goel ........................... 528/48 |
| 4,746,725 | A | | 5/1988 | Evans et al. ................ 528/370 |
| 4,788,254 | A | | 11/1988 | Kawakubo et al. ......... 525/100 |
| 4,797,504 | A | * | 1/1989 | Roling .......................... 560/4 |
| 4,823,927 | A | | 4/1989 | Jensen ...................... 193/35 SS |
| 4,920,188 | A | | 4/1990 | Sakashita .................... 526/196 |
| 4,921,921 | A | | 5/1990 | Ritter ........................ 526/195 |
| 4,985,477 | A | | 1/1991 | Collins et al. ............. 523/212 |
| 4,985,516 | A | | 1/1991 | Sakashita et al. ........... 526/196 |
| 5,034,464 | A | | 7/1991 | Arduengo .................... 525/207 |
| 5,082,147 | A | | 1/1992 | Jacobs ........................ 222/137 |
| 5,106,928 | A | | 4/1992 | Skoultchi et al. ........... 526/196 |
| 5,143,884 | A | * | 9/1992 | Skoultchi et al. ........... 502/160 |
| 5,204,386 | A | | 4/1993 | Ersun-Hallsby et al. .... 423/443 |
| 5,223,597 | A | | 6/1993 | Iwakiri et al. ................ 528/31 |
| 5,250,228 | A | | 10/1993 | Baigrie et al. ............... 252/511 |
| 5,286,821 | A | | 2/1994 | Skoultchi .................... 526/196 |
| 5,308,895 | A | | 5/1994 | Gan et al. ................... 523/445 |
| 5,310,835 | A | | 5/1994 | Skoultchi et al. ........... 526/198 |
| 5,344,890 | A | | 9/1994 | Miyazono et al. ....... 525/326.5 |
| 5,376,746 | A | | 12/1994 | Skoultchi .................... 526/196 |
| 5,401,805 | A | | 3/1995 | Chung et al. ................ 525/288 |
| 5,404,805 | A | | 4/1995 | Fujimoto et al. ........... 101/118 |
| 5,409,995 | A | | 4/1995 | Iwahara et al. ............. 525/100 |
| 5,420,223 | A | | 5/1995 | Johnson ...................... 528/91 |
| 5,539,070 | A | | 7/1996 | Zharov et al. .............. 526/198 |
| 5,567,833 | A | | 10/1996 | Iwahara et al. ............. 556/434 |
| 5,599,856 | A | | 2/1997 | Gardner ...................... 523/453 |
| 5,616,796 | A | | 4/1997 | Pocius et al. ................. 564/9 |
| 5,621,143 | A | | 4/1997 | Pocius .......................... 564/8 |
| 5,674,941 | A | | 10/1997 | Cho et al. ................... 525/102 |
| 5,679,458 | A | | 10/1997 | Cho et al. ................... 428/412 |
| 5,681,910 | A | | 10/1997 | Pocius ........................ 526/198 |
| 5,684,102 | A | | 11/1997 | Pocius ........................ 526/196 |
| 5,686,544 | A | | 11/1997 | Pocius ........................ 526/196 |
| 5,690,780 | A | | 11/1997 | Zharov et al. .............. 156/332 |
| 5,691,065 | A | | 11/1997 | Zharov et al. .............. 428/421 |
| 5,705,561 | A | | 1/1998 | Kozakiewicz et al. ...... 524/730 |
| 5,718,977 | A | | 2/1998 | Pocius ........................ 428/422 |
| 5,721,281 | A | | 2/1998 | Blount ......................... 521/50 |
| 5,795,657 | A | | 8/1998 | Pocius et al. ............... 428/516 |
| 5,807,910 | A | | 9/1998 | Tseng et al. ................ 523/428 |
| 5,817,376 | A | | 10/1998 | Everaerts et al. ........... 427/483 |

(Continued)

FOREIGN PATENT DOCUMENTS

| EP | 0651002 A2 | | 5/1995 |
|---|---|---|---|
| GB | 1039914 | * | 8/1966 |
| GB | 1127127 | | 9/1968 |
| WO | 96/19179 | | 6/1996 |
| WO | 97/07151 | | 2/1997 |
| WO | 97/07171 | | 2/1997 |
| WO | 98/17694 | | 4/1998 |
| WO | 99/64475 | | 12/1999 |
| WO | 01/44311 A1 | | 6/2001 |

OTHER PUBLICATIONS

U.S. Appl. No. 11/019,056, filed Dec. 21, 2004, Gary Jialanella et al.

(Continued)

*Primary Examiner*—Ling-Sui Choi
(74) *Attorney, Agent, or Firm*—Norman L. Sims (57) ABSTRACT

The invention is polymerizable compositions comprising in one part an organoboron compound capable of forming a free radical generating species and a stabilizing amount of one or more compounds comprising a dihydrocarbyl hydroxyl amine, an alicyclic hydroxyl amine, or a nitrile oxide of a dihydrocarbyl hydroxyl amine or an alicyclic hydroxyl amine, and in the second part one or more compounds capable of free radical polymerization.

20 Claims, 2 Drawing Sheets

U.S. PATENT DOCUMENTS

| | | | |
|---|---|---|---|
| 5,837,155 A | 11/1998 | Inagaki et al. | 216/18 |
| 5,859,155 A | 1/1999 | Furihata et al. | 525/531 |
| 5,872,197 A | 2/1999 | Deviny | 526/192 |
| 5,883,208 A | 3/1999 | Deviny | 526/198 |
| 5,912,433 A | 6/1999 | Pulido | 174/77 |
| 5,935,711 A | 8/1999 | Pocius et al. | |
| 5,948,854 A | 9/1999 | de Buyl et al. | 524/788 |
| 5,952,409 A | 9/1999 | Boardman et al. | 524/185 |
| 5,990,036 A | 11/1999 | Deviny | 502/162 |
| 5,994,484 A | 11/1999 | Pocius | 526/196 |
| 6,001,928 A | 12/1999 | Harkness et al. | 524/858 |
| 6,008,284 A | 12/1999 | Nylund et al. | 524/425 |
| 6,008,308 A | 12/1999 | Pocius | 526/196 |
| 6,027,813 A | 2/2000 | Deviny | 428/422 |
| 6,054,548 A | 4/2000 | Currie et al. | 528/23 |
| 6,090,904 A | 7/2000 | Körner et al. | 528/34 |
| 6,093,778 A | 7/2000 | Pocius | 526/196 |
| 6,207,781 B1 | 3/2001 | Halloran et al. | 528/14 |
| 6,252,023 B1 | 6/2001 | Moren | 526/196 |
| 6,410,667 B1 | 6/2002 | Moren | 526/217 |
| 6,630,555 B2 | 10/2003 | Kendall et al. | 526/195 |
| 6,706,831 B2 | 3/2004 | Sonnenschein et al. | 526/196 |
| 6,710,145 B2 | 3/2004 | Sonnenschein et al. | 526/196 |
| 6,713,578 B2 | 3/2004 | Sonnenschein et al. | 526/196 |
| 6,713,579 B2 | 3/2004 | Sonnenschein et al. | 526/196 |
| 6,730,759 B2 | 5/2004 | Sonnenschein et al. | 526/196 |
| 6,740,716 B2 | 5/2004 | Webb et al. | 526/196 |
| 6,762,260 B2 | 7/2004 | Sonnenschein et al. | 526/196 |
| 6,777,512 B1 | 8/2004 | Sonnenschein et al. | 526/196 |
| 6,806,330 B1 | 10/2004 | Sonnenschein et al. | 526/196 |
| 2002/0028894 A1 | 3/2002 | Sonnenschein et al. | 526/198 |
| 2003/0018611 A1 | 1/2003 | Yano et al. | 707/1 |
| 2003/0226472 A1 | 12/2003 | Kneafsey et al. | 106/18.13 |
| 2004/0068067 A1 | 4/2004 | Kneafsey et al. | 526/178 |
| 2004/0082743 A1 | 4/2004 | Sonnenschein et al. | 526/217 |
| 2005/0004332 A1 | 1/2005 | Jialanella et al. | |

OTHER PUBLICATIONS

J. Harris et al., J. Appl. Polym Sci., 10, 523-534 (1966), Proposed Mechanism for the Curing of Epoxy Resins with Amine-Lewis Acid Complexes or Salts.

Love, Peter et al., "Polar Substituent Effects in Gas-Phase Lewis Acid-Base Quilibria. I. Intrinsic Basicity of Amines", J. Amer. Chem. Soc. (1968). 90(10), 2455-62, XP000982168, tables I, EX. T columns 4 and 5.

Chemical Abstracts, Fujisawa, Seiichiro et al., "Dental Self-Curing Resins. XI. Chacterization of Several Complexes of tri-n-butyl Borane as an Initiator" 73:88532, XP002160417-Abstract & Iyo Kizai Kenkyusho Hokoku, Tokyo Ika Shika Daigaku (1969), 3, 64-71.

Journal or Organometallic Chemistry, Hoberg et al., 1976, 118(1), C3-C5 (no translation provided).

Journal of Applied Polymer Science, vol. 43, (1991) pp. 2115-2121, "Grafting of Methyl Methacrylate onto Silk Fibers Initiated by Tri-*n*-Butylborane" M. Tsukada, et al.

Journal of Polymer Science, vol. 6, Pt. 2, (1968) pp. 3157-3162 "Vinyl Monomer Polymerization Mechanism in the Presence of Trialkylboranes" J. Grotewold, et al.

Journal of Polymer Science, vol. 61, (1962) pp. 241-261, Bailey and Kokle et al.

Koester, Roland et al., "Boron Compounds. XXVII. Borylation of several amino carboxylic acids", Justus Liebigs Ann, Chem. (1974), (1), 112-19, XP000982170, (no translastion provided).

Journal of Applied Polymer Science, vol. 43, (1991), pp. 2115-2121, "Grafting of Methyl Methacrylate onto silk Fibers Initiated by Tri-n-Butylborane", M. Tsukada et al.

Journal of Applied Polymer Science, vol. 10, (1966), pp. 523-534, Proposed Mechanism for the Curing of Epoxy Resins with Amine-Lewis Acid Complexes or Salts.

Plastics Technical Section, Dr. Gordon M. Kline, pp. 149, 150. 152, 154, 155, 158, 160, 186 (1964).

Modern Synthetic Reactions, Herbert O. House, pp. 786 (1972).

Chemical Abstracts, vol. 119, 1983, p. 78, 119:74163c Acrylic Adhesive Composition and Organoborane Initiator System.

Derwent Abstract, 96-453820/45, ADGE=93.05.28, Adgeziv Co. Ltd., RU 2054022-C1.

Derwent 92-085634/11, J04029-393-A, Shinetsu Chem Ind KK.

Derwent 92-289585/35, JP04199694-A, Shinetsu Chem Ind Co Ltd.

Derwent 94-164114/20, JP06107907-A, Nippon Zeon KK.

Derwent 95-041525/06, JP06322324-A, Shinetsu Chem Ind Co Ltd.

Derwent 95-049086/07, JP06330015-A, Nissan Motor Co. Ltd.

Derwent 97-529863/49, JP09208921-A, Shinetsu Chem Ind Co Ltd.

Chemical Abstract, 128:218101s, Acrylic Adhesive Compositions, Kimura, JP 10-046,125.

Derwent 98-189554/17, JP10046126-A, Nippon Synthetic Chem Ind Co.

Derwent 98-343543/30, JP10130612-A, Nippon Synthetic Chem Ind Co.

Derwent 98-357757/31, JP10140119-A, Nippon Synthetic Chem Ind Co.

Derwent 99-283642/24, JP11092593-A, Hitachi Chem Co. Ltd.

Chemical Abstract 116:195541w, Epoxy resin binder for commutator sheet mica, Ivanilova et al.

Derwent 84-159009/26, DD207436-A, Veb Filmfab Wolfen.

Derwent 90-332394/44, J02240130-A, Denki Kagaku Kogyo KK.

Derwent 1985-301176/48, SU 1155607, Kirakosyan, KII A.

Derwent 1990-332395/44, JP 02-240, 131, Denki Kagaku Kogyo KK.

Derwent 96-453820/45, RU2054022-C1, Adgeziv Co. Ltd.

Polymer Letters, vol. 8, pp. 541-547 (1970) Polymerization of Methyl Methacrylate by Trialkylborane-Pyridine System.

ZH. Obshch. Khim., Dorokhov et al., 1976, 46(5), pp. 1053-1059.

Derwent AN 1996-484098, SU 1457392A1, Dodonov et al.

Derwent AN 1997-010377, SU 1609117A1, Dodonov et al.

Derwent AN 1997-064052, SU 162491A1, Dodonov et al.

Derwent, 99-010842/02, DE 19738208-A1, Tseng T. et al.

Derwent 87-331368/47, J62236-878-A, Sumitomo Elec.Ind. KK.

Derwent 88-202092/29, J63139-969-A, Kanegafuchi Chem KK.

Journal of Polymer Science, vol. 6, Pt. 2, (1968), pp. 3157-3162, "Vinyl Monomer Polymerization Mechanism in the Presence of Trialkylboranes", J. Grotewold, et al.

* cited by examiner

STABILIZED ORGANOBORANE POLYMERIZATION INITIATORS AND POLYMERIZABLE COMPOSITIONS

This application claims the benefit of U.S. Provisional Application No. 60/477,135, filed Jun. 9, 2003.

BACKGROUND OF THE INVENTION

This invention relates to stabilized polymerizable compositions comprising compounds containing moieties capable of free radical polymerization and organoborane initiators capable of initiating free radical polymerization and adhesives based on such compositions. In another embodiment the invention relates to a method of polymerizing compounds containing moieties capable of free radical polymerization and to methods of bonding substrates using such compositions.

Low surface energy olefins such as polyethylene, polypropylene and polytetrafluroethylene have a variety of attractive properties in a variety of uses, such as toys, automobile parts, furniture applications and the like. Because of the low surface energy of these plastic materials, it is very difficult to find adhesive compositions that bond to these materials. The commercially available adhesives that are used for these plastics require time consuming or extensive pretreatment of the surface before the adhesive will bond to the surface. Such pretreatments include corona treatment, flame treatment, the application of primers, and the like. The requirement for extensive pretreatment of the surface results in significant limitations to the designers of automobile components, toys, furniture and the like.

A series of patents issued to Skoultchi (U.S. Pat. Nos. 5,106,928; 5,143,884; 5,286,821; 5,310,835 and 5,376,746 (all incorporated herein by reference)) disclose a two-part initiator system that is useful in acrylic adhesive compositions. The first part of the two-part system includes a stable organoborane amine complex and the second part includes a destabilizer or activator such as an organic acid or an aldehyde. The organoborane compound of the complex has three ligands, which can be selected from $C_{1-10}$ alkyl groups or phenyl groups. The adhesive compositions are disclosed to be useful in structural and semi-structural adhesive applications, such as speaker magnets, metal to metal bonding, automotive glass to metal bonding, glass to glass bonding, circuit board component bonding, bonding select plastics to metal, glass to wood, etc. and for electric motor magnets.

Zharov, et al. discloses in a series of US patents (U.S. Pat. No. 5,539,070; U.S. Pat. No. 5,690,780; and U.S. Pat. No. 5,691,065 (all incorporated herein by reference)) polymerizable acrylic compositions which are particularly useful as adhesives wherein organoborane amine complexes are used to initiate cure. It is disclosed that these complexes are good for initiating polymerization of an adhesive that bonds to low surface energy substrates.

Pocius in a series of patents (U.S. Pat. No. 5,616,796; U.S. Pat. No. 5,621,143; U.S. Pat. No. 5,681,910; U.S. Pat. No. 5,686,544; U.S. Pat. No. 5,718,977; and U.S. Pat. No. 5,795,657 (all incorporated herein by reference)) disclose amine organoborane complexes with a variety of amines such as polyoxyalkylene polyamines and polyamines which are the reaction product of diprimary amines and compound having at least two groups which react with a primary amine. Pocius (U.S. Pat. No. 5,686,544) discloses a composition comprising an organoborane polyamine complex, polyol and an isocyanate decomplexing agent.

Kendall et al., U.S. Pat. No. 6,630,555 and Kneafsey et al., U.S. Patent Publications 2003/0226472 and 2004/0068067 disclose quaternary boron salts which may be used as initiators for the polymerization in adhesive compositions. The adhesive compositions may be used for bonding low surface energy substrates.

Many of the initiators disclosed in the prior art are not stable in compositions containing olefinic unsaturation at, or near, ambient temperatures and induce polymerization at, or near, ambient temperature with time. This instability at or near, ambient temperature can result in polymerization before desired and can result in compositions that are unsuitable for the desired use. Further, the compositions generally are two part compositions in which one side is a resin side and the other side is a hardener. One side (hardener) contains the organoborane compound and the other contains the decomplexing agent. In most cases the volume ratio of the two parts is significantly different, that is greater, than 4:1, often up to about or at 10:1. The problem is that most commercial equipment designed to dispense two part compositions utilizes ratios of 4:1 or less. In order to get these compositions to work in such equipment, resin or nonreactive ingredients are added to one side or the other to get a suitable volumetric ratio. The problem is that if resin is added to the side containing the organoborane compound, the mixture may be unstable and could begin to cure at ambient temperatures and render the composition useless. If excessive inert materials are added to the hardener side, the inert ingredient can act as a plasticizer or create a weak continuous phase and negatively impact the properties of the polymerized composition.

Some of the references discussed above disclose the use of phenolic compounds, such as hydroquinones to stabilize the compositions against undesired polymerization. See Pocius U.S. Pat. No. 5,684,102 at column 18, lines 45-53; Pocius U.S. Pat. No. 5,861,910 at column 13 lines 17 to 24. Jennes U.S. Pat. No. 3,236,823 discloses the use of hydroquinones, phenathiazine or t-butyl pyrocatechol as stabilizers in alkylborane initiated acrylate systems.

Therefore, there is a need for adhesive systems which are capable of bonding to low surface energy substrates, and initiator systems which facilitate such bonding. What are further needed are polymer compositions and adhesive systems which are thermally stable at, or near, ambient temperatures and which will undergo polymerization when the user desires. Also needed are adhesive compositions which are capable of bonding to low surface energy substrates, and bonding low surface energy substrates to other substrates, without the need for extensive or costly pretreatment. Further compositions that can be used in existing commercial equipment at mix ratios of 4:1 or less are needed. Compositions that have stability, strength and adhesion at elevated temperatures are also desired.

SUMMARY OF INVENTION

The invention is a two part polymerizable composition comprising in one part an organoboron compound capable of forming a free radical generating species and one or more compounds comprising a dihydrocarbyl hydroxyl amine, an alicyclic hydroxyl amine, or a nitrile oxide of a dihydrocarbyl hydroxyl amine or an alicyclic hydroxyl amine, and in the second part one or more compounds capable of free radical polymerization. In a preferred embodiment, the second part further contains an agent capable of causing the organoborane compound to form a free radical generating species upon contacting the two parts. In another embodiment the polymerizable compositions of the invention can be formulated into adhesive compositions. In another preferred embodiment the first part further comprises one or more compounds capable of free radical polymerization. This facilitates formulating compositions that have commercially desirable volumetric ratios of the two parts. Adhesive compositions of the present formulation provide excellent adhesion to low surface energy substrates, such as plastics.

The invention is also a method of polymerization comprising contacting the components of the polymerizable composition under conditions such that the polymerizable compounds undergo polymerization. In one embodiment, the contacting occurs at, or near, ambient temperature. In another embodiment, the method further comprises the step of heating the polymerized composition to an elevated temperature under conditions such that the organoborane compound forms a free radical generating species.

In another embodiment the invention is a one part polymerizable composition comprising an organoboron compound capable of forming free radical generating species compounds; a dihydrocarbyl hydroxyl amine, a cycloaliphatic hydroxyl amine, or a nitrile oxide of a dihydrocarbyl hydroxyl amine or an alicyclic hydroxyl amine; and one or more compounds capable of free radical polymerization. The organoboron compound can form a free radical generating species by heating the composition to a temperature at which the free radical generating species is formed.

In yet another embodiment the invention is a method of bonding two or more substrates together which comprises contacting the components of the polymerizable composition together under conditions, such that polymerization is initiated; contacting the polymerizable composition with the two or more substrates; positioning the two or more substrates, such that the polymerizable composition is located between the two or more substrates; and allowing the polymerizable composition to polymerize and to bond the two or more substrates together.

In yet another embodiment the invention is a method of coating a substrate which comprises contacting a composition according to the invention with one or more surfaces of a substrate and initiating polymerization of the composition according to the invention.

In another embodiment the invention is a laminate comprising two substrates having disposed between the substrates and bound to each substrate a composition according to the invention.

The polymerizable compositions of the invention can form good bonds to low surface energy substrates without the need for primers or surface treatment These polymerizable compositions can be used as adhesives, coatings or to laminate substrates together. The polymerizable compositions of the invention may be formulated to be dispensed in commercial equipment at volume ratios of the two parts of 4:1 or less. The polymerized compositions demonstrate excellent cohesive and adhesive strength at elevated temperatures and thus demonstrate excellent stability at all temperatures.

DETAILED DESCRIPTION OF THE INVENTION

The polymerization initiator is an organoboron containing compound which is capable of forming a trivalent organoboron compound. In a preferred embodiment, the free radical generating species is a trivalent organoboron compound free radical generating species. Preferred boron containing compounds are tetravalent in that they have four bonds to the boron of which at least three are covalent and one may be covalent or in the form of an electronic association with a complexing agent. The free radical generating species, such as a trivalent boron compound, is formed when the boron containing compound is contacted with another substance, referred to herein as a decomplexing agent or initiator. The free radical generating species generates free radicals by reacting with environmental oxygen. In the embodiment wherein the boron containing compound is tetravalent such contacting causes the abstraction of one of the ligands bonded to or complexed to the boron atom to convert it to a trivalent borane. Free radical containing species is a compound that contains or generates free radicals under polymerization conditions. The decomplexing agent or initiator can be any compound which reacts with the complexing agent or which abstracts a cation from the boron containing compound. Preferably, the boron containing compound is an organoborate or an organoborane complex.

An organoborate is a salt of a positive cation and an anionic tetravalent boron. Any organoborate which can be converted to an organoborane by contact with a decomplexing agent or initiator may be used. One class of preferred organoborates, (also known as quaternary boron salts) are disclosed in Kneafsey et al., U.S. 2003/0226472 and Kneafsey et al., U.S. 2004/0068067, both incorporated herein by reference. Preferred organoborates disclosed in these two U.S. patent applications are described by the following formula wherein $R^{14}$ is $C_1$-$C_{10}$ alkyl;

$R^{15}$ is independently in each occurrence $C_1$-$C_{10}$ alkyl, $C_3$-$C_{10}$ cycloalkyl, phenyl, phenyl-substituted $C_1$-$C_{10}$ alkyl or phenyl substituted $C_3$-$C_{10}$ cycloalkyl, provided that any two of $R^{14}$ and/or $R^{15}$ may optionally be part of a carbocyclic ring; and $M^+$ is a metal ion or a quaternary ammonium ion. Preferred examples of organoborates include sodium tetraethyl borate, lithium tetraethyl borate, lithium phenyl triethyl borate and tetramethylammonium phenyl triethyl borate.

In another embodiment, the organoborate is an internally blocked borate as disclosed in Kendall et al., U.S. Pat. No. 6,630,555, incorporated herein by reference. Disclosed in this patent are four coordinate internally blocked borates wherein the boron atom is part of a ring structure further containing an oxa or thio-moiety. The internally blocked heterocyclic borates preferably have the following structure:

wherein J is oxygen or sulfur; when J represents oxygen, n is the integer 2, 3, 4 or 5; when J represents sulfur, n is the integer 1, 2, 3, 4 or 5; $R_{16}$, $R_{17}$, $R_{18}$ and $R_{19}$ are independently, substituted or unsubstituted alkyl or alkylene groups containing 1 to 10 carbon atoms, substituted aryl groups having up to 7 to 12 carbon atoms or unsubstituted aryl groups; $R_{17}$, $R_{18}$ and $R_{19}$ can be hydrogen; $R_{16}$ can be part of a second unsubstituted or substituted cyclic borate; $R_{16}$ can comprise a spiro ring or a spiro-ether ring; $R_{16}$ together with $R_{17}$ can be linked to form a cycloaliphatic ring; or $R_{16}$ together with $R_{17}$ can comprise a cyclic ether ring and M is any positively charged species; with m being greater than 0.

The term "internally blocked" in reference to the organoborates described herein means a four coordinate boron atom being part of an internal ring structure bridged across two of the four boron coordinates or valences. Internal blocking includes a single ring or a two-ring structure where boron is part of one or multi-ring structures.

In the embodiment where the organoborane compound is in the form of an amine complex, the free radical generating species used in the invention is a trialkyl borane or an alkyl cycloalkyl borane. Preferably such borane corresponds to:

wherein B represents Boron; and $R^2$ is separately in each occurrence a $C_{1-10}$ to alkyl, $C_{3-10}$ cycloalkyl, or two or more of $R^2$ may combine to form a cycloaliphatic ring. Preferably $R^2$ is $C_{1-4}$ alkyl, even more preferably $C_{2-4}$ alkyl, and most preferably $C_{3-4}$ alkyl. Among preferred organoboranes are triethyl borane, tri-isopropyl borane and tri-n-butylborane.

In the embodiment wherein the organoboron compound is an organoborane amine complex, the organoborane is a trivalent oganoborane and the amine can be any amine which complexes reversibly with the organoborane. Such complexes are represented by the formula wherein $R^2$ is described hereinbefore and Am is an amine.

In the embodiment where the organoboron compound is an organoborane amine complex, the amines used to complex the organoborane compound can be any amine or mixture of amines which complex the organoborane and which can be decomplexed when exposed to a decomplexing agent or exposed to elevated temperatures. The desirability of the use of a given amine in an amine/organoborane complex can be calculated from the energy difference between the Lewis acid-base complex and the sum of energies of the isolated Lewis acid (organoborane) and base (amine) known as binding energy. The more negative the binding energy the more stable the complex.

Binding Energy=−(Complex Energy−(Energy of Lewis Acid+Energy of Lewis base))

Such binding energies can be calculated using theoretical ab-initio methods such as the Hartree Fock method and the 3-21G basis set. These computational methods are available commercially employing commercial software and hardware such as SPARTAN and Gaussian 98 programs with a Silicon Graphics workstation. Amines having amine/organoborane binding energies of 10 kilocalories per mol or greater are preferred, amines having a binding energy of 15 kilocalories per mol or greater are more preferred and even more preferred are amines with a binding 20 kilocalories per mol or greater are most preferred. In the embodiment where polymerization of the compositions of the invention is initiated by use of a decomplexing agent the binding energy of the amine to the organoborane is preferably about 50 kcal/mole or less and most preferably about 30 kcal/mole or less. In the embodiment where polymerization of the compositions of the invention is initiated by use of heat, the binding energy of the amine is preferably about 100 kcal/mole or less, more preferably about 80 kcal/mole or less and most preferably about 50 kcal/mole or less.

Preferred amines include the primary or secondary amines or polyamines containing primary or secondary amine groups, or ammonia as disclosed in Zharov U.S. Pat. No. 5,539,070 at column 5, lines 41 to 53, incorporated herein by reference, Skoultchi U.S. Pat. No. 5,106,928 at column 2, lines 29 to 58, incorporated herein by reference, and Pocius U.S. Pat. No. 5,686,544 at column 7, line 29 to Column 10, line 36, incorporated herein by reference; ethanolamine, secondary dialkyl diamines or polyoxyalkylenepolyamines; and amine terminated reaction products of diamines and compounds having two or more groups reactive with amines as disclosed in Deviny U.S. Pat. No. 5,883,208 at column 7, line 30 to column 8 line 56, incorporated herein by reference. With respect to the reaction products described in Deviny the preferred diprimary amines include alkyl diprimary amines, aryl diprimary amines, alkyaryl diprimary amines and polyoxyalkylene diamines; and compounds reactive with amines include compounds which contain two or more moieties of carboxylic acids, carboxylic acid esters, carboxylic acid halides, aldehydes, epoxides, alcohols and acrylate groups. Preferred amines described in Deviny include n-octylamine, 1,6-diaminohexane (1,6-hexane diamine), diethylamine, dibutyl amine, diethylene triamine, dipropylene diamine, 1,3-propylene diamine(1,3-propane diamine), 1,2-propylene diamine, 1,2-ethane diamine, 1,5-pentane diamine, 1,12-dodecanediamine, 2-methyl-1,5-pentane diamine, 3-methyl-1,5-pentane diamine, triethylene tetraamine and diethylene triamine. Preferred polyoxyalkylene polyamines include polyethyleneoxide diamines, polypropyleneoxide diamines, triethylene glycol propylene diamine, polytetramethyleneoxide diamine and polyethyleneoxidecopolypropyleneoxide diamines.

In one preferred embodiment, the amine comprises a trialkyl borane or an alkyl cycloalkyl borane and the amine comprises a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocyclic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines; or mixtures thereof as described in Sonnenschein et al., U.S. Patent Publication 2002/0028894 at paragraphs 0018 to 0045, incorporated herein by reference.

In another preferred embodiment, the amine further contains siloxane, that it is an amino siloxane. Any compound with both amine and siloxane units wherein the amine has sufficient binding energy as described hereinbefore with the organoborane, may be used. Preferably, the siloxane moiety will permit this component to participate in polymerization of siloxane monomers, oligomers, and/or polymers when present. The siloxane containing monomers, oligomers, and/or polymers can be any compound which contains silicone. Preferably, the siloxane compound has reactive functionality. Preferable reactive functionalities include hydride, olefinic unsaturation, hydroxyl and hydrolyzable moieties that hydrolyze to form a silanol moiety. Preferred amine silanes are disclosed in Sonnenschein et al., U.S. patent application Ser. No. 10/377,440, filed Feb. 28, 2003 at page 13, line 1 to page 17, line 9, incorporated herein by reference.

In the embodiment where the organoboron compound is an organoborane amine complex, the equivalent ratio of amine compound(s) to borane compound in the complex is relatively important. An excess of amine is preferred to enhance the stability of the complex and in the embodiment where the decomplexing agent is an isocyanate functional compound to react with the isocyanate functional compound thereby resulting in the presence of polyurea in the final product. The presence of polyurea improves the high temperature properties of the composition.

Compounds capable of free radical polymerization which may be used in the polymerizable compositions of the invention include any monomers, oligomers, polymers or mixtures thereof which contain olefinic unsaturation which can polymerize by free radical polymerization. Such compounds are well known to those skilled in the art. Mottus, U.S. Pat. No. 3,275,611 at column 2, line 46 to column 4, line 16 and Sonnenschein et al., U.S. 2002/0028894 at paragraph 47 provides descriptions of such compounds, incorporated herein by reference.

In the embodiment where the composition is used as an adhesive, acrylate and/or methacrylate based compounds are preferably used. The most preferred acrylate and methacrylate compounds include methylmethacrylate, butylmethacrylate, 2-ethylhexylmethacrylate, and cyclohexylmethylmethacrylate. Preferred amounts of compounds capable of free radical polymerization (such as acrylate and/or methacrylate based compounds) are preferably about 10 percent by weight or greater, more preferably about 20 percent by weight or greater and most preferably about 30 percent by weight or greater based on the weight of the formulation. Preferred amounts of compounds capable of free radical polymerization (such as acrylate and/or methacrylate based compounds) are preferably about 90 percent by weight or less based on the total formulation weight, more preferably about 85 percent by weight or less and most preferred 80 percent by weight or less.

The compositions of the invention include two part polymerizable compositions comprising in one part an organoboron compound and one or more compounds containing one or more ring opening heterocyclic moieties, and in a second part, compounds capable of being polymerized by free radical polymerization, a catalyst capable of polymerizing compounds containing ring opening heterocyclic moieties and optionally a component that will decomplex the organoborane compound. In one embodiment the invention is a two phase system comprising a first phase containing one or more polymers prepared from the compounds which polymerize by free radical polymerization and a second phase comprising polymerized or partially polymerized compounds derived from one or more compounds containing ring opening heterocyclic moieties. In one embodiment the polymer prepared from the compounds containing heterocyclic ring opening moieties is not miscible with the polymer prepared by free radical polymerization and thus the resulting polymerized composition has at least two regions, each region rich in one of the two polymers formed. In one embodiment the two part compositions invention includes a polymerized portion comprising polymerized compound capable of free radical polymerization and a second portion comprising unpolymerized or partially polymerized compounds having ring opening heterocyclic moieties. The two portions can be miscible, partially miscible or immiscible. In a preferred embodiment the polymerized composition comprises two phases, one based on the compounds which polymerize through olefinic bonds and a second which polymerizes by a ring opening reaction of a heterocyclic moiety. The cured compositions of the invention preferably contain two regions that in many cases are not miscible. In some embodiments the two regions are separate phases or are interpenetrating networks of two different polymers. The two regions can be chemically bonded to one another if the composition includes a crosslinking compound.

The compound containing a heterocyclic ring opening moiety can be any monomer, oligomer or prepolymer containing a heterocyclic moiety capable of ring opening and polymerization. The heteroatom in the heterocyclic moiety is preferably nitrogen, oxygen or sulfur, with nitrogen and oxygen being preferred and oxygen being most preferred. Preferably the heterocyclic moiety is a 3 membered ring. Preferred heterocyclic moieties are oxirane and aziridine moieties, with oxirane moieties being most preferred. Preferred heterocyclic ring opening polymerizable compounds are disclosed in Sonnenschein, U.S. Patent Publication 2003/018,611, paragraphs 0048 and 0049 and U.S. Pat. No. 5,308,895 at column 8, line 6, Formula 6 and column 8, line 9, and Formula 9, incorporated herein by reference.

The presence of the polymer derived from the heterocyclic ring opening polymerizable compound, such as oxirane and aziridine, improves adhesion to higher surface energy plastics such as nylon, and also the thermal properties of the polymerized or partially polymerized compositions of the invention. A sufficient amount of the heterocyclic ring opening compound is used to improve the bonding to higher surface energy substrates and to improve the high temperature properties of the polymerized or partially polymerized composition. Thermal properties as referred to herein include higher glass transition temperatures of the polymerized compositions and improved cohesive strength at elevated temperatures, as evidenced by higher lap shear strengths at elevated temperature, such as 125 and 150° C. When the heterocyclic ring opening polymerizable compound is present, the polymerizable formulation preferably contains a sufficient amount of heterocyclic ring opening polymerizable compound to improve significantly the glass transition temperature or lap shear strength at a given elevated temperature of the polymerizable formulation. A significant improvement of glass transition temperature is 5° C. A significant improvement in lap shear strength is about 50 psi or greater at 125° C. The total polymerizable formulation may contain about 2 percent by weight of heterocyclic ring opening polymerizable compound or greater; more preferably about 5 percent by weight or greater and most preferred about 10 percent by weight or greater. The polymerizable formulation may contain about 50 percent by weight or less, more preferably about 45 percent by weight of less and most preferably about 40 percent by weight or less of heterocyclic ring opening polymerizable compound.

In some cases it may be useful to crosslink the free radical polymerizable compound phase to the heterocyclic ring opening polymerizable compound derived phase. This is achieved using a bi-functional monomer, hereinafter referred to as a crosslinker, containing both olefinic unsaturation functionality, for instance, an acrylic moiety, and heterocyclic ring opening polymerizable functionality, or isocyanate functionality. Examples of this type of material include glycidyl acrylates, for instance glycidyl methacrylate, or isocyanato acrylates, such as 2-isocyanatoethyl methacrylate. Such compounds react under normal conditions of the reaction to react with reactive components in each phase of the polymerizable composition. The amount of crosslinker used is that amount which gives the desired properties, that is sufficient lap shear strength at 125° C. or above, yet does not cause the room temperature adhesive strength to go below the desired value. Preferred amounts of such crosslinker are about 0 percent by weight or greater based on the weight of the polymerizable formulation, more preferably about 1 percent by weight or greater; even more preferably about 3 percent by weight or greater and most preferably about 5 percent by weight or greater. Preferably the amount of crosslinker used is about 20 percent by weight of the total polymerizable formulation or less; even more preferably about 15 percent by weight or less and most preferably about 12 percent by weight or less.

In a preferred embodiment the ring opening polymerization of heterocyclic compounds is initiated by contacting the heterocyclic compounds with a Lewis acid catalyst as described by Arnold, R. J. Mod. Plastics, 41, 149 (1964), and J. Harris and S. Temin J. Appl. Polym Sci., 10, 523, (1966), both incorporated herein by reference. Any Lewis acid that initiates polymerization of the heterocyclic compounds may be used, such as those described in House, H. Modern Synthetic Methods $2^{nd}$ Edition, p. 786, (1972) incorporated herein by reference. Preferable Lewis acids include boron trichloride, boron trifluoride, tin tetrachloride, zinc dichloride, titanium tetrachloride and aluminum trichloride. In some embodiments, the Lewis acid may be complexed with a weak Lewis base to stabilize it in air against reaction with water vapor. Weak Lewis base as used herein means the Lewis base is a weaker Lewis base than the ring opening polymerizable compound in the composition for which the Lewis Acid is intended to catalyze polymerization. Among preferred Lewis Bases are amines, ketones and ethers. Particularly useful in these applications is amine and ether complexes of boron trifluoride ($BF_3$) and tin tetrachloride ($SnCl_4$). Tin tetrachloride can possess good shelf life in some adhesive formulations without the need for complexation. Preferable amines useful as complexation agents for the Lewis Acid include amine substituted aromatic compounds, such as aniline, substituted anilines, diphenyl amine, and substituted diphenyl amines. Preferable ethers useful as complexation agents for the Lewis Acid include low boiling ethers (boiling point of less than 50° C.).

Preferable ethers are dialkyl ethers, such as diethyl ether, and dimethyl ether and cycloaliphatic ethers, such as tetrahydrofuran. Preferred ketones include acetone. Lewis acid catalysts are used in sufficient amounts to initiate polymerization of the heterocyclic moiety containing compounds, in particular they can be used in relatively small amounts, and stoichiometry does not need to be closely monitored as required with some curable systems. Preferably the amount of Lewis acid catalyst used is about 0.1 percent by weight of the total formulation or greater, more preferably about 0.25 percent by weight or greater and most preferably about 0.5 percent by weight or greater. Preferably the amounts of Lewis acid catalyst used is about 10 percent by weight of the total formulation or less, more preferably about 8 percent by weight or less and most preferably about 6 percent by weight or less.

In a preferred embodiment, compositions of the invention may further comprise a compound with one or more compounds, oligomers or prepolymers having a siloxane backbone and reactive moieties capable of polymerization. The compounds, oligomers or prepolymers having a siloxane backbone and reactive moieties capable of polymerization useful in this invention include any compound, oligomer or prepolymer containing siloxane units in the backbone and which have reactive groups which can polymerize under reasonable reaction conditions compositions and are further described in Sonnenschein et al., U.S. patent application Ser. No. 10/377,440, filed Feb. 28, 2003 at page 20, line 1 to page 27, line 15 relevant parts incorporated herein by reference. The presence of functional siloxane polymerizable compounds, such as described above, improves low temperature flexibility and elongation of polymerized or partially polymerized composition by providing a phase of very low Tg polymer while still providing excellent adhesion to low surface energy substrates. A sufficient amount of the siloxane functional materials are used to improve the physical properties of the polymerized or partially polymerized composition and to improve the low temperature properties of the polymerized or partially polymerized composition. The Tg of the compositions can be controlled by controlling the amount of siloxane polymer and its crosslink density. An amount of siloxane polymer is present to achieve a glass transition temperature of about 0° C. or less. Preferably, the polymeric compositions demonstrate lap shear strength is about 100 psi or greater. It is preferred that the total polymerizable formulation contain about 1 percent by weight or greater of siloxane polymerizable compound; more preferably about 2 percent by weight or greater and most preferred about 3 percent by weight or greater. It is preferred that the polymerizable formulation contain about 90 percent by weight or less, more preferably about 85 percent by weight or less and most preferably about 80 percent by weight or less of siloxane polymerizable compound.

A convenient method of incorporating additional functionality into the polymerizable composition and improve the physical properties of the siloxane functionality is to include in the formulation polyfunctional siloxane containing crosslinkers. Polyfunctional siloxane containing crosslinkers comprise compounds, oligomers and polymers which contain siloxane units and at least two, preferably 2 to 4, functional groups which react with the functional groups of the reactive materials present to crosslink the polymeric materials present. Preferably, there are at least two different functional groups present which react with different compounds, oligomers or polymers present to link the different polymeric materials formed together. Preferably, one reacts with the siloxane based materials and one reacts with the functional materials containing unsaturated groups present or formed in the reaction. Examples of such materials are (3-glycidylpropyl)trimethoxy siloxane, (acryloxypropyl)trimethoxysilane, (methacryloxypropyl)trimethoxysiloxane, (methacrylopropyl)methyl siloxane-dimethylsiloxane copolymer, methacryloxypropylpropyl-terminated polydimethylsiloxane, (acryloxypropyl) methylsiloxane dimethylsiloxane copolymer and the like. In one embodiment, an oxirane ring is incorporated into the formulation as well as an alkoxy siloxane capable of crosslinking silanol functional siloxane containing polymers. In the other cases, acrylic and methacrylic functionality is incorporated capable of crosslinking the siloxane containing phase to an acrylic phase. Other examples are mercapto functional siloxanes and isocyanato functional siloxanes. All of these materials are commercially available from companies such as Shin-Etsu Silicones, Witco, Dow Corning, Gelest and others. Siloxane containing compounds, oligomers and/or prepolymers which vinyl and hydrolyzable groups may also be used.

In some cases, it may be useful to crosslink the free radical polymerizable compound phase to the siloxane compound derived phase. This is achieved using a bi-functional monomer, hereinafter referred to as a crosslinker, containing both olefinic unsaturation functionality, for instance, an acrylic moiety and silicone functional polymerizable functionality. Examples of this type of material include (acryloxypropyl)trimethoxysiloxane and (methacryloxypropyl)trimethoxysiloxane. Similarly, the siloxane phase can be crosslinked to the rigid polyurea phase produced by the reaction of the amine from the alkylborane-amine complex and an isocyanate. Such crosslinking materials include 3-aminopropyltriethoxysiloxane, 3-aminopropyltrimethoxysiloxane, 3-isocyanatopropyltrimentooxysiloxane, N-(2-aminoethyl)-3-aminopropyltrimethoxysiloxane. Such compounds react under normal conditions of the reaction with reactive components of a separate phase of the polymerizable composition. The amount of crosslinker used is that amount which gives the desired properties, that is, sufficient lap shear strength at room temperature, yet does not cause the bond flexibility strength to go below the desired value. Preferred amounts of crosslinker are about 0 percent by weight or greater based on the weight of the polymerizable formulation, more preferably about 1 percent by weight or greater; most preferably about 2 percent by weight or greater. Preferably, the amount of crosslinker used is about 20 percent by weight of the total polymerizable formulation or less; even more preferably about 15 percent by weight or less and most preferably about 12 percent by weight or less.

In a preferred embodiment, the reaction of siloxane functional materials containing epoxy substituent(s) is achieved by incorporation of a catalyst as described by Saunders, K. J. in *Organic Polymer Chemistry*, $2^{nd}$ Edition, Chapter (1988), incorporated herein by reference. A variety of catalysts are useable in the practice of the current technology depending on the silicone chemistry being employed. Tin catalysts are often used to promote reactions between sloxane functional materials. Favored tin catalysts include dibutyltin diacetate and dibutyl tin dilaurate. Tetraalkoxytitanium catalysts have been described by de Buyl et al., in U.S. Pat. No. 5,948,854 and in improvement by Nylund et al., in U.S. Pat. No. 6,008,284 for moisture curable room temperature vulcanizates. Various acidic catalysts are taught by Falender et al., in U.S. Pat. No. 4,448,927, all of which are included herein by reference. Platinum catalysts are also employed for polymerization of vinyl functionalized siloxanes. Examples of favored platinum catalysts include chloroplatinic acid and platinum (O)-1,3-divinyl-11,1,3,3-tetramethyldisiloxane complex. The previous examples of useful catalysts are just provided for illustration and the present invention is not limited to them. In general, any catalyst that is useful for polymerizing siloxane functional monomers or oligomers will be useful in the present invention as long as it does not interfere with the catalyst or polymerizable components of the free radical component of the present invention.

Catalysts are used in sufficient amounts to initiate polymerization of the siloxane functional compounds; in particular they can be used in relatively small amounts. Preferably, the amount of catalyst used is about 0.1 percent by weight of the total formulation or greater, more preferably about 0.25 percent by weight or greater and most preferably about 0.5 percent by weight or greater. Preferably, the amounts of catalyst used is about 10 percent by weight of the total formulation or less, more preferably about 8 percent by weight or less and most preferably about 6 percent by weight or less.

It is preferable that the heterocyclic ring opening polymerizable compounds and siloxane polymerizable compounds polymerize at a similar rate as the polymerization rate of the compounds containing moieties capable of free radical polymerization. If the reaction of one polymerizable component is too slow, the composition may vitrify or gel prior to obtaining acceptable conversion of monomer or oligomer to polymer of both phases. The unreacted components can act as a plasticizer and degrade properties, such as adhesion, thermal performance and the like. The properties of the final polymerized composition may be enhanced by post heating the polymerized composition to drive the completion of the polymerization. This is performed by heating the polymerized composition to a temperature above its glass transition temperature. In this embodiment, it is preferred to post cure at the expected use temperature of the structure, more preferred at 5° C. above the expected use temperature of the composition and most preferred to provide a thermal post cure of 10° C. above the expected use temperature of the polymerized composition. Examples of post cure procedures are disclosed in Briggs (U.S. Pat. No. 4,426,243) and Ersun-Hallsby, et al. (U.S. Pat. No. 5,204,386), incorporated herein by reference.

The organoborane compounds useful for polymerization of the compounds having moieties capable of free radical polymerization may be converted to compounds capable of forming free radical generating species by the application of a decomplexation agent that will cause the formation of compounds capable of forming free radical generating species, such as a trivalent borane compound, such as by displacing the amine from the borane. The formation of compounds capable of forming the free radical generating species such as, trivalent borane, such as by displacement of the amine from the alkylborane of an organoborane amine complex, can occur with any chemical for which the exchange energy is favorable, such as mineral acids, organic acids, Lewis acids, isocyanates, acid chlorides, sulphonyl chlorides, aldehydes, and the like. Preferred decomplexation agents are acids and isocyanates. In those embodiments where the heterocyclic ring opening compound is present and initiator for the ring opening polymerization is a Lewis acid, the decomplexing agent may be omitted as Lewis acids may also function as the decomplexing agent. If the Lewis acid is used as the decomplexing agent and heterocyclic ring opening polymerization initiator no additional amounts are needed over those amounts needed to initiate polymeriza- tion. The choice of initiator may be impacted by the use of the polymerizable composition. In particular, where the polymerizable composition is an adhesive and the material to which it will be bonded is polypropylene, the preferred class of initiators is isocyanate initiators and where the substrate is nylon the preferred initiators are acids. Polymerization may also be initiated thermally. The temperature at which the composition is heated to initiate polymerization is dictated by the binding energy of the group being removed from the boron containing compound. Generally the temperature used to initiate the polymerization by forming the compounds capable of forming free radical containing species, for example, by decomplexing an organoborane amine complex, is about 30° C. or greater and preferably about 50° C. or greater. Preferably the temperature at which thermally initiated polymerization is initiated is about 120° C. or less and more preferably about 100° C. or less. Any heat source that heats the composition to the desired temperature can be used, provided the heat source does not negatively impact the components of the composition or its function. In this manner the composition may be contacted with the substrates either before or after the composition is exposed to heat. If the composition is heated prior to contact with the substrates, the composition should be contacted with the substrates before the composition has polymerized to the point at which the composition is no longer able to adhere to the substrates. It may be necessary in the thermally initiated reaction to control the oxygen content such that there is adequate oxygen to create favorable conditions for radical formation but not so much as to inhibit the polymerization.

The compositions of the invention contain a stabilizing amount of an alicyclic hydroxylamine or a dihydrocarbyl hydroxyl amine; or a nitroxyl or nitrile oxide thereof. Stabilizing as used herein refers to preventing polymerization until desired. Generally this means that polymerization is inhibited under normal storage conditions. Normal storage conditions mean storage at a temperature of about 0° C. to about 40° C., wherein the adhesive is stored in a sealed container. A stable composition is one that does not experience undesired viscosity growth during a defined period. Viscosity growth is evidence of polymerization of the monomers present. In a preferred embodiment, a composition is stable if the viscosity does not increase more than 150 percent over a time period of 30 days when stored at temperatures of 40° C. or less, more preferably 100 percent or less over a time period of 30 days and most preferably 50 percent or less over a time period of 30 days.

Dihydrocarbyl hydroxyl amines, alicyclic hydroxyl amines and nitrile oxides thereof, useful herein include any such compounds which when included in the compositions of this invention improve the stability of the compositions as described herein. Alicyclic hydroxyl amine means a nitrogen containing aliphatic heterocycle wherein the nitrogen atom has a hydroxyl moiety bound thereto. The hydrocarbyl groups on the dihydrocarbyl hydroxyl amine and the alicyclic hydroxyl amines can be substituted with any substituent which does not significantly impact the performance of these additives in formulations of this invention.

Preferred dihydrocarbyl hydroxyl amines and alicyclic hydroxyl amines correspond to the formula $(R^{13})_2$—OH wherein $R^{13}$ is independently in each occurrence a hyrocarbyl moiety or the two $R^{13}$ may combine to form a cyclic ring, wherein the hydrocarbyl groups or cyclic ring may be substituted with one or more substituents which do not interfere with the function of the compounds in this invention.

In one embodiment, the nitroxyl or nitrile oxides are illustrated by the formula wherein $R^{13}$ is described above.

Preferably $R^{13}$ is independently in each occurrence a $C_{2-30}$ alkyl, alkaryl or aryl moiety or two $R^{13}$ form a $C_{2-30}$ cycloalkyl moiety; more preferably a $C_{10-20}$ alkyl, alkaryl or aryl moiety and two $R^{13}$ are $C_{2-7}$ cycloalkyl; with $C_{10-20}$ alkyl moieties being even more preferred. Among preferred dihydrocarbyl hydroxyl amines are hydroxylamine freebase from BASF, hydroxylamine derivatives from Mitsui Chemicals America, Inc., N-hydroxyl bis(N-benzyl)amine available as BNX 2000 from Mayzo Inc. and Irgastab FS Products from Ciba Specialty Chemicals which contains oxidized bis(hydrogenate tallow alkyl)amine, also described as bis(N-dodecyl) N-hydroxyl amine and Xenoxyl available from Avecia, Inc. and having the structure The dihydrocarbyl hydroxyl amines, alicyclic hydroxyl amines or nitrile oxides thereof are utilized in sufficient amounts to stabilize the compositions of the invention. Preferably the hydroxyl amines are used in an amount of about 1 parts per million of the compositions of the invention or greater, more preferably about 2 parts per million or greater and most preferably about 5 parts per million or greater. Preferably the hydroxyl amines are used in an amount of about 100,000 parts per million of the compositions of the invention or less, more preferably about 50,000 parts per million or less, even more preferably about 10,000 parts per million or less and most preferably about 3,000 parts per million or less.

The two-part polymerizable compositions or adhesive compositions of the invention are uniquely suited for use with conventional, commercially available dispensing equipment for two-part compositions. Once the two-parts have been combined, the composition should be used quickly, as the useful pot life (open time) may be short depending upon the monomer mix, the amount of complex, the amount of polymerization catalyst and the temperature at which the bonding is to be performed. The adhesive compositions of the invention are applied to one or both substrates and then the substrates are joined together, preferably with pressure to force excess adhesive composition out of the bond line. In general, the bonds should be made shortly after the composition has been applied, preferably within about 20 minutes, more preferably within about 10 minutes. The typical bond line thickness is about 0.005 inches (0.13 mm) to about 0.03 inches (0.76 mm). The bond line can be thicker if gap filling is needed as the composition of the invention can function as both an adhesive and a gap filler. The bonding process can easily be carried out near or above room temperature.

The compositions may further comprise a variety of optional additives. One particularly useful additive is a thickener such as medium to high (about 10,000 to about 1,000,000) molecular weight polymethyl methacrylate which may be incorporated in an amount of about 10 to about 60 weight percent, based on the total weight of the composition. Thickeners may be employed to increase the viscosity of the composition to facilitate application of the composition.

In some embodiments, such as where a heterocyclic ring opening compound is present and is an oxirane, it may desirable to include some aziridine containing compound in the formulation as the aziridine enhances the stability of the formulation. Generally, enough aziridine is added to improve the stability of the formulation. Preferably about 1 percent by weight or greater of aziridine based on the weight of the formulation is used and more preferably about 2 percent by weight or greater. Preferably about 10 percent by weight or less of aziridine based on the formulation weight is used and more preferably about 7 percent by weight or less is used.

Polymerizable compositions according to the invention may be used in wide variety of ways, including as sealants, coatings, primers, to modify the surface of polymers, and injection molding resins. They may also be used as matrix resins in conjunction with glass and metal fiber mats, such as in resin transfer molding operations. They may further be used as encapsulants and potting compounds such as in the manufacture of electrical components, printed circuit boards and the like. Quite desirably, they provide polymerizable adhesive compositions that can bond a diverse myriad of substrates, including polymers, wood, ceramics, concrete, glass and primed metals. Another desirable related application is their use in promoting adhesion of paints to low surface energy substrates such as polyethylene, polypropylene, polyethyleneterephthalate, polyamides, and polytetrafluoroethylene, and their co-polymers. In this embodiment the composition is coated onto the surface of the substrate to modify the surface to enhance the adhesion of the final coating to the surface of the substrate.

The compositions of the invention can be used in coating applications. In such applications the composition may further comprise a carrier such as a solvent. The coating may further contain additives well known to those skilled in the art for use coatings, such as pigments to color the coating, inhibitors and UV stabilizers. The compositions may also be applied as powder coatings and may contain the additives well known to those skilled in the art for use in powder coatings.

The compositions of the invention can also be used to modify the surface of a polymeric molded part, extruded film or contoured object. Compositions of the invention can also be used to change the functionality of a polymer particle by surface grafting of polymer chains on to the unmodified plastic substrate.

Polymerizable compositions of the invention are especially useful for adhesively bonding low surface energy plastic or polymeric substrates that historically have been very difficult to bond without using complicated surface preparation techniques, priming, etc. By low surface energy substrates is meant materials that have a surface energy of about 45 mJ/m$^2$ or less, more preferably about 40 mJ/m$^2$ or less and most preferably about 35 mJ/m$^2$ or less. Included among such materials are polyethylene, polypropylene, acrylonitrile-butadiene-styrene, polyamides, syndiotactic polystyrene, olefin containing block co-polymers, and fluorinated polymers such as polytetrafluoroethylene (TEFLON™) which has a surface energy of less than about 20 mJ/m$^2$. (The expression "surface energy" is often used synonymously with "critical wetting tension" by others.)

Other polymers of somewhat higher surface energy that may be usefully bonded with the compositions of the invention include polycarbonate, polymethylmethacrylate, and polyvinylchloride.

The polymerizable compositions of the invention can be easily used as two-part adhesives. The components of the polymerizable compositions are blended as would normally be done when working with such materials. The decomplexing agent for the organoborane amine complex is usually included with the olefinic, polymerizable component so as to separate it from the organoborane amine complex, thus providing one-part of the two-part composition. The organoborane amine complex of the polymerization initiator system provides the second part of the composition and is added to the first part shortly before it is desired to use the composition. Similarly, the catalyst for the heterocyclic ring opening compound or siloxane compound polymerization is kept separate from such compounds. The catalyst may be added to the first part directly or it may be pre-dissolved in an appropriate carrier such as a reactive olefinic monomer, i.e., methyl methacrylate or a MMA/PMMA viscous solution. The second part may contain monomers having olefinic unsaturation to balance the volumes of the two parts.

For a two-part adhesive such as those of the invention to be most easily used in commercial and industrial environments, the volume ratio at which the two-parts are combined should be a convenient whole number. This facilitates application of the adhesive with conventional, commercially available dispensers. Such dispensers are shown in U.S. Pat. Nos. 4,538,920 and 5,082,147 (incorporated herein by reference) and are available from Conprotec, Inc. (Salem, N.J.) under the trade name MIXPAC. Typically, these dispensers use a pair of tubular receptacles arranged side-by-side with each tube being intended to receive one of the two-parts of the adhesive. Two plungers, one for each tube, are simultaneously advanced (e.g., manually or by a hand-actuated ratcheting mechanism) to evacuate the contents of the tubes into a common, hollow, elongated mixing chamber that may also contain a static mixer to facilitate blending of the two-parts. The blended adhesive is extruded from the mixing chamber onto a substrate. Once the tubes have been emptied, they can be replaced with fresh tubes and the application process continued.

The ratio at which the two-parts of the adhesive are combined is controlled by the diameter of the tubes. (Each plunger is sized to be received within a tube of fixed diameter, and the plungers are advanced into the tubes at the same speed.) A single dispenser is often intended for use with a variety of different two-part adhesives and the plungers are sized to deliver the two-parts of the adhesive at a convenient mix ratio. Some common mix ratios are 1:1, 2:1, 4:1 and 10:1, but preferably less than about 10:1 and more preferably less than about 4:1 and most preferably about 1:1.

Preferably the mixed two-part compositions of the invention have a suitable viscosity to allow application without dripping. Preferably, the viscosities of the two individual components should be of the same order or magnitude. Preferably the mixed compositions have the viscosity of about 100 (0.1 Pa·S) centipoise or greater, more preferably about 1,000 (1.0 Pa·S) centipoise or greater and most preferably about 5,000 (5.0 Pa·S) centipoise or greater. Preferably the adhesive compositions have a viscosity of about 1,000,000 (1000 Pa·S) centipoise or less, more preferably about 500,000 (500 Pa·S) centipoise or less and most preferably about 30,000 (30 Pa·S) centipoise or less.

SPECIFIC EMBODIMENTS

The following examples are included for illustrative purposes only and are not intended to limit the scope of the claims. Unless otherwise stated all parts and percentages are by weight.

Ingredients

The following ingredients were used in the examples provided hereinafter:

methyl methacrylate available from Rohm and Haas;

poly(methylmethacrylate) available from Rohm-Degussa-Huls Gruppe under the trademark and designation DEGALON LP51/07;

styrene-butadiene-styrene triblock block copolymer available from Dexco Polymers under the trademark and designation VECTOR 2518;

fumed silica available from Cabot Corporation under the trademark and designation CAB-O-SIL TS-720;

poly(methyl methacrylate)polyacrylate copolymer from Rohm and Haas Company under the trademark and designation PARALOID EXL 2691A;

isophorone diisocyanate available from Creanova;

Butylated hydroxytoluene (BHT) from Aldrich Chemical Company;

oxidized bis(hydrogenated tallow alkyl)amines(bis(N-dodecyl)N-hydroxyl amine (available under the trademark and designation IRGASTAB FS042);

butanedioic acid, dimethylester, polymer with 4-hydroxy-2,2,6,6-tetramethyl-1-piperidine ethanol (available under the trademark TINUVIN 622 from Ciba Specialty Chemicals);

IRGASTAB™ FS301 a mixture of oxidized bis(hydrogenated tallow alkyl)amines (IRGASTAB™ FS 042) and Tris(2,4-ditert-butyl phenol) phosphite available from Ciba Specialty Chemicals;

IRGAPHOS™ 168 is tris(2,4-ditertbutyl phenol)phosphite;

Complex of tri-n-butyl borane and methoxypropyl amine;

JEFFAMINE™ T403 is difunctional polyamine based on polypropylene oxide;

Hydroquinone (HQ);

Methyl ether of hydroquinone (MEHQ);

BNX™ 2000 is dibenzyl hydroxylamine available from Mayzo Inc. and corresponds to the Formula

BLS™ 1770 is alicyclic ester hindered amine available from Mayzo Inc. and corresponds to the formula

BHT™ is 3,5-di-tertiary butyl-4-hydroxyl toluene, available from Aldrich Chemical and corresponds to the formula PIZ™ Phenothiazine is available from Avecia Inc. and is represented by the formula XENONYL™ stabilizer is (4-hydroxyl-2,6-tetramethyl)piperidinyl oxide available from Avecia Inc. and corresponds to the formula Two part formulations were prepared by mixing the ingredients for each part and then placing them in separate containers. Several different part B formulations were made.

Part A comprises 69.1 percent of methyl methacrylate, 17.5 percent of poly(methylmethacrylate), 4.9 percent of a styrene-butadiene triblock block copolymer, 3.0 percent of fumed silica and 5.5 percent of isophorone diisocyanate Part B comprised 15 percent of a tri-n-butyl borane-methoxy propyl amine complex, 8.0 percent of JEFFAMINE™ T403 amine terminated polyether polyol, 54 percent of methyl methacrylate, 15 percent of poly(methylmethacrylate), 7 percent of poly(methyl methacrylate) polyacrylate copolymer and a stabilizer as listed below.

| Example | Concentration | Stabilizer | OH amine Concentration |
|---|---|---|---|
| 1 | 2,500 ppm | IRGASTAB ™ FS 301 | 1250 ppm |
| 2 | 2,500 ppm | IRGASTAB ™ FS 301 without BHT | 1250 ppm |
| 3 | 2,500 ppm | IRGASTAB ™ FS 042 | 2500 ppm |
| 4 | 2,500 ppm | IRGAFOS ™ 168 | 0 ppm |
| 5 | 2,500 ppm | phenothiazine | 0 ppm |
| 6 | 2,500 ppm | TINUVIN ™ 622 | 0 ppm |
| 7 | 2,500 ppm | BHT ™ | 0 ppm |

Each part B was aged in an oven at 40 Centigrade over a period of time. Periodically the viscosity was measured for each part B. The results of the aging are compiled in Table 2 and illustrated in FIG. 1 which illustrates the number of days at 40° C. versus the viscosity.

Figure 1:
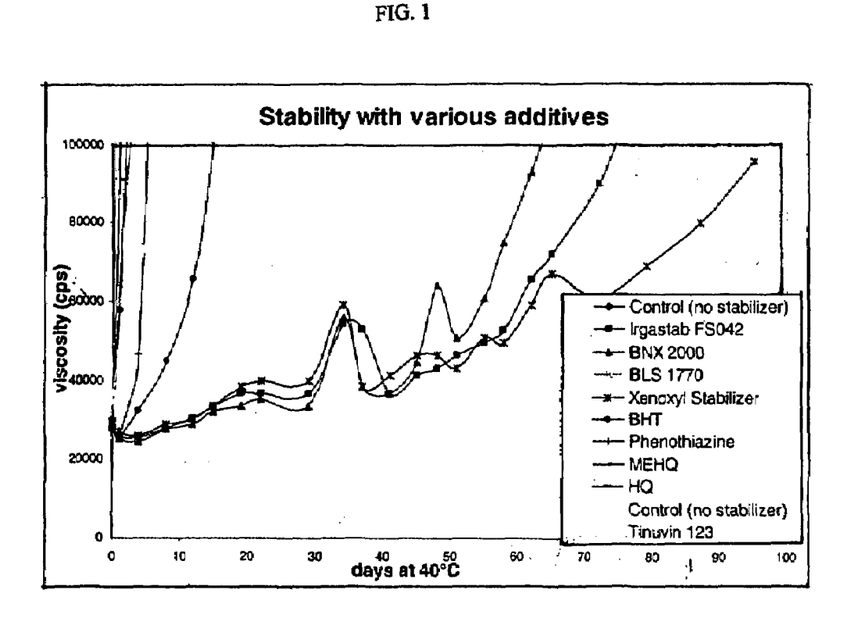
FIG. 1 is a graph of the viscosity of formulations having different stabilizers over several days when heated at 40° C.

| | Viscosity (centipoise) Example | | | | | | |
|---|---|---|---|---|---|---|---|
| Days | 1 | 2 | 3 | 4 | 5 | 6 | 7 |
| 0 | 28800 | 28800 | 30400 | 28800 | 28800 | 27200 | 28800 |
| 1 | 30400 | 30400 | 33600 | 28800 | 32000 | 28800 | 33600 |
| 4 | 30400 | 28800 | 30400 | 27200 | 27200 | 24000 | 40000 |
| 6 | 32000 | 30400 | 33600 | 30400 | 30400 | 24000 | 41600 |
| 11 | 36800 | 33600 | 38400 | 43200 | 43200 | 41600 | 43200 |
| 13 | 36800 | 36800 | 38400 | 67000 | 59000 | 41600 | — |
| 15 | 36800 | 36800 | 40000 | 222000 | 73500 | 48000 | 69000 |
| 18 | 38400 | 36800 | 46400 | | 146000 | 59000 | 100000 |
| 20 | 44800 | 36800 | 43200 | | 253000 | 96000 | |
| 22 | 46100 | 41600 | 48000 | | | 111000 | |
| 25 | 44800 | 41600 | 46000 | | | 167000 | |
| 27 | 46400 | 48000 | 49600 | | | 290000 | |
| 29 | 48000 | 48000 | 54500 | | | | |
| 32 | 51000 | 48000 | 51000 | | | | |
| 36 | 40000 | 38400 | 41600 | | | | |
| 40 | 56000 | 56000 | 61000 | | | | |
| 43 | 56000 | 56000 | 61000 | | | | |
| 46 | 51000 | 53000 | 54500 | | | | |
| 53 | 88000 | 131000 | 96000 | | | | |

The examples illustrate the use of the oxidized bis(hydrogenated tallow alkyl)amines enhances the stability of compositions of the invention.

EXAMPLES 8 TO 16

Examples 8 to 16 were prepared according to the description for Examples 1 to 7. The relative amount of components in the formulations cited is listed below.

TABLE 2

| | Parts |
|---|---|
| Resin Side | |
| MMA ™ | 69.1 |
| DEGALON ™ LP51/07 | 17.5 |
| VECTOR ™ 2518P | 4.9 |
| CAB-O-SIL ™ TS720 | 3.0 |
| IPDI ™ | 5.5 |
| | 100.0 |
| Hardener Side | |
| TNBB ™/MOPA ™ Complex | 15 |
| JEFFAMINE ™ T403 | 8 |
| MMA ™ | 50 |
| DEGALON ™ LP 51/07 | 15 |
| PARALOID ™ EXL2691A | 7 |
| CAB-O-SIL ™ | 0 |
| Stabilizer/MMA ™ soln | 5 |
| VS5500 ™ | 0 |

Table 3 shows the stabilized formulations.

TABLE 3

| Example | Stabilizer | Adding MMA soln | Wt % Stabilizer in MMA | G of Stabilizer in 40 g soln |
|---|---|---|---|---|
| 8 | Control (no stabilizer) | 5.00 | 0.00 | 0.00 |
| 9 | IRGASTAB ™ FS042 | 5.00 | 5.00 | 2.00 |
| 10 | BNX ™ 2000 | 5.00 | 1.85 | 0.74 |
| 11 | BLS ™ 1770 | 5.00 | 4.08 | 1.63 |
| 12 | XENOXYL ™ Stabilizer | 5.00 | 1.60 | 0.64 |
| 13 | BHT ™ | 5.00 | 1.82 | 0.73 |
| 14 | Phenothiazine | 5.00 | 1.85 | 0.74 |
| 15 | MEHQ ™ | 5.00 | 1.15 | 0.46 |
| 16 | HQ ™ | 5.00 | 1.02 | 0.41 |

Table 4 shows the viscosities measured at various days after exposure to 40° C. temperatures.

TABLE 4

| Accelerator Days at 40° C. | 8 Control (no stabilizer) | 9 IRGASTAB ™ FS042 | 10 BNX ™ 2000 | 11 BLS ™ 1770 | 12 XENOXYL ™ Stabilizer | 13 BHT | 14 PTZ ™ Phenothiazine | 15 MEHQ ™ | 16 HQ ™ |
|---|---|---|---|---|---|---|---|---|---|
| 0 | 29600 | 28800 | 28000 | 29600 | 29200 | 28000 | 28400 | 28000 | 30400 |
| 1 | 58000 | 26000 | 25200 | 64500 | 27200 | 25600 | 26000 | 91000 | 216000 |
| 4 | 160000 | 25600 | 24400 | 136000 | 26000 | 32400 | 46800 | 283000 | |
| 8 | 247000 | 28000 | 27600 | 284000 | 28800 | 45000 | 246000 | | |
| 12 | 472000 | 30400 | 28800 | | 30400 | 65500 | | | |
| 15 | | 33600 | 32000 | | 33600 | 102000 | | | |
| 19 | | 36800 | 33600 | | 38400 | 185000 | | | |

TABLE 4-continued

| Accelerator Days at 40° C. | 8 Control (no stabilizer) | 9 IRGASTAB™ FS042 | 10 BNX™ 2000 | 11 BLS™ 1770 | 12 XENOXYL™ Stabilizer | 13 BHT | 14 PTZ™ Phenothiazine | 15 MEHQ™ | 16 HQ™ |
|---|---|---|---|---|---|---|---|---|---|
| 22 | | 36800 | 35200 | | 40000 | 230000 | | | |
| 29 | | 36800 | 33600 | | 40000 | | | | |
| 34 | | 54500 | 56000 | | 59000 | | | | |
| 37 | | 53000 | 38400 | | 38400 | | | | |
| 41 | | 36800 | 36800 | | 41600 | | | | |
| 45 | | 41600 | 44800 | | 46400 | | | | |
| 48 | | 43200 | 64000 | | 46400 | | | | |
| 51 | | 46400 | 51000 | | 43200 | | | | |
| 55 | | 49600 | 61000 | | 51000 | | | | |
| 58 | | 53000 | 75000 | | 49600 | | | | |
| 62 | | 65500 | 93000 | | 59000 | | | | |
| 65 | | 72000 | 109000 | | 67000 | | | | |
| 72 | | 90000 | 156000 | | 61000 | | | | |
| 79 | | 120000 | 2000000 | | 69000 | | | | |
| 87 | | 144000 | 302000 | | 80000 | | | | |
| 95 | | | | | 96000 | | | | |

Table 4 shows the viscosity change for each formulation.

Figure 2:
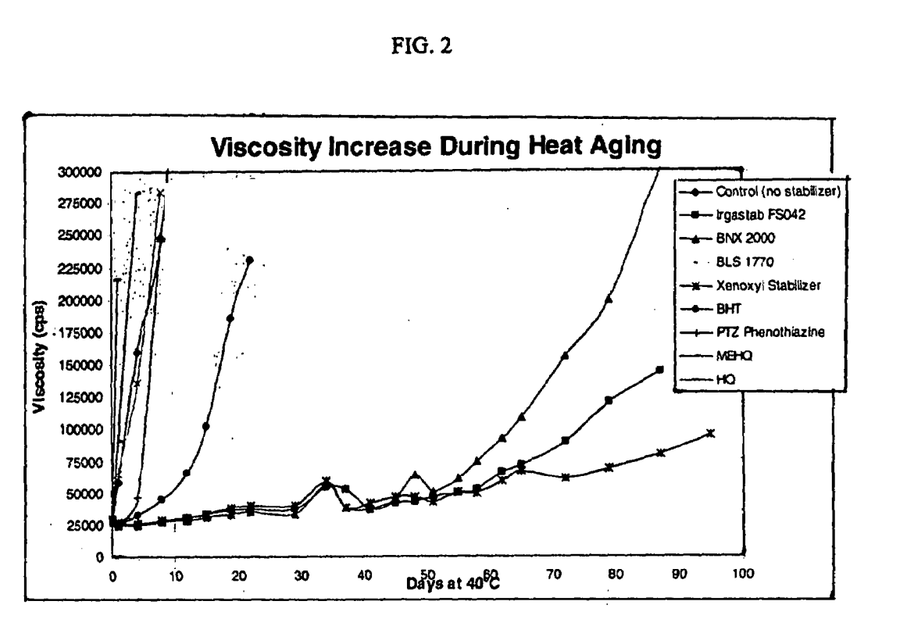
FIG. 2 is a graph of the viscosity of formulations having different stabilizers over several days when heated at 40° C.

FIG. 2 shows a graph of the viscosity against number of days at 40° C. The viscosity was measured using a Brookfield Viscometer Model DV-II at 20 rpm with a number 7 spindle. FIG. 2 and Table 4 show that compositions containing IRGASTAB™ FS042, BNX™2000 and XENOXYL™ stabilizers all show much greater stability than do other materials tested.

What is claimed is:

1. A two part polymerizable composition comprising in one part an organoboron compound capable of forming a free radical generating species and one or more compounds comprising a dihydrocarbyl hydroxyl amine, an alicyclic hydroxyl amine, a nitrile oxide of a dihydrocarbyl hydroxyl amine or a nitrile oxide of alicyclic hydroxyl amine, and in the second part one or more compounds capable of free radical polymerization; wherein the organoboron compound is an organoborane amine complex or an organoborate salt.

2. A two part composition according to claim 1 wherein the second part further contains a decomplexing agent capable of converting the organoboron compound to a free radical generating species upon contacting the two parts.

3. A two part composition according to claim 2 wherein the organoboron compound is an organoborane amine complex.

4. A two part composition according to claim 2 wherein the first part further comprises one or more compounds capable of free radical polymerization.

5. A two part composition according to claim 4 wherein the one or more hydroxyl amine compounds correspond to the formula $(R^{13})_2$N—OH or the formula $(R^{13})_2$—N—O wherein $R^{13}$ is independently in each occurrence a hydrocarbyl moiety or two $R^{13}$ form a cyclic ring.

6. A two part composition according to claim 5 which comprises at least about 1 parts per million by weight to about 100,000 part per million by weight by weight of one or more hydroxyl amine compounds.

7. The two par composition according to claim 6 where the one or more compounds capable of free radical polymerization comprise acrylate or methacrylate monomers, oligomers, polymers or a mixture thereof.

8. The two part composition according to claim 7 wherein $R^{13}$ is separately in each occurrence a $C_{1-30}$ hydrocarbyl moiety or two $R^{13}$ form a $C_{2-17}$ ring.

9. The two part composition according to claim 8 wherein the organoborane amine complex comprises a trialkyl borane or an alkyl cycloalkyl borane and the amine comprises a primary amine; a secondary amine; a polyamine having primary or secondary amines or both; ammonia; polyoxyalkylene amines; the reaction product of a diamine and a difunctional compound having moieties which react with an amine, wherein the reaction product has terminal amine groups; aryl amines; heterocyclic amines; a compound having an amidine structural component; aliphatic heterocycles having at least one secondary nitrogen in the heterocyclic ring wherein the heterocyclic compound may also contain one or more additional secondary or tertiary nitrogen atoms, oxygen atoms, sulfur atoms, or double bonds in the heterocycle; alicyclic compounds having bound to the alicyclic ring one or more substituents containing an amine moiety; conjugated imines; or mixtures thereof.

10. A method of polymerization comprising contacting the components of the polymerizable composition of claim 1 under conditions such that the one or more compounds capable of free radical polymerization undergo polymerization.

11. The method of claim 10 wherein the contacting occurs at, or near, ambient temperature.

12. The method claim 10 which further comprises the step of heating the composition to an elevated temperature under conditions such that the organoborane amine complex disassociates.

13. A method of bonding two or more substrates together which comprises:
   a. contacting the components of the composition of claim 1 together under conditions such that polymerization is initiated;
   b. contacting the adhesive composition with the two or more substrates;
   c. positioning the two or more substrates such that the adhesive composition is located between the two or more substrates wherein they are in contact with one another; and d. allowing the adhesive to cure so as to bind the two or more substrates together.

14. A method of bonding two or more substrates according to claim 13 which further comprises heating the adhesive composition to a temperature such that a free radical generating species is formed.

15. A method of modifying the surface of a low surface energy polymer by contacting a composition according to claim 1 with at least a portion of the surface of the low surface energy polymer and causing the organoboron compound convert to a free radical generating species thereby initiating polymerization of the monomer, oligomers, polymers or mixture thereof such that the polymer formed is on the surface of the low surface energy polymer.

16. A method of coating a substrate which comprises contacting the components of the composition of claim 1; contacting the contacted composition with one or more surfaces of a substrate; and allowing the coating composition to cure.

17. A method of polymerization comprising contacting the components of the polymerizable composition of claim 2 under conditions such that the one or more compounds capable of free radical polymerization undergo polymerization.

18. A method of bonding two or more substrates together which comprises:

a. contacting the components of the composition of claim 2 together under conditions such that polymerization is initiated;
b. contacting the adhesive composition with the two or more substrates;
c. positioning the two or more substrates such that the adhesive composition is located between the two or more substrates wherein they are in contact with one another; and
d. allowing the adhesive to cure so as to bind the two or more substrates together.

19. A method of modifying the surface of a low surface energy polymer by contacting a composition according to claim 2 with at least a portion of the surface of the low surface energy polymer and causing the organoboron compound convert to a free radical generating species thereby initiating polymerization of the monomer, oligomers, polymers or mixture thereof such that the polymer formed is on the surface of the low surface energy polymer.

20. A method of coating a substrate which comprises contacting the components of the composition of claim 2; contacting the contacted composition with one or more surfaces of a substrate; and allowing the coating composition to cure.

* * * * *